(12) United States Patent
Ladouceur (10) Patent No.: US 7,047,617 B2
(45) Date of Patent: May 23, 2006

(54) METHOD OF ATTACHING A SELF-PIERCING ELEMENT IN A PANEL AND DIE MEMBER

(75) Inventor: Harold A. Ladouceur, Livonia, MI (US)

(73) Assignee: Whitesell International Corporation, Taylor, MI (US)

( * ) Notice: Subject to any disclaimer, the term of this patent is extended or adjusted under 35 U.S.C. 154(b) by 225 days.

(21) Appl. No.: 10/733,704

(22) Filed: Dec. 11, 2003

(65) Prior Publication Data

US 2004/0130932 A1 Jul. 8, 2004

Related U.S. Application Data

(63) Continuation of application No. 10/004,918, filed on Dec. 5, 2001, now abandoned.

(51) Int. Cl.
*B23P 11/00* (2006.01)

(52) U.S. Cl. .......................... 29/432.1; 29/505; 29/509; 29/525.01; 29/525.05; 29/798; 29/283.5; 29/432.2; 72/358; 72/372; 72/379.2; 72/464

(58) Field of Classification Search ............... 29/432.1, 29/432.2, 505, 509, 513, 525.01, 525.05, 29/798, 243.5, 283.5, 525.06, 524.1; 411/107, 411/179, 180, 181; 73/353.2, 354.6, 356; 72/356, 358, 359, 372, 379.2, 353.2, 354.6, 72/464, 469

See application file for complete search history.

(56) References Cited

U.S. PATENT DOCUMENTS

| 2,707,322 | A | 5/1955 | Strain et al. |
| 4,555,838 | A | 12/1985 | Müller ...................... 29/432.1 |
| 4,810,143 | A | 3/1989 | Muller ........................ 411/181 |
| 5,020,950 | A | 6/1991 | Ladouceur .................. 411/107 |
| 5,056,207 | A | 10/1991 | Ladouceur ................. 29/432.2 |
| 5,092,724 | A | 3/1992 | Muller ........................ 411/179 |
| 5,140,735 | A | 8/1992 | Ladouceur ............. 29/243.522 |
| 5,644,830 | A | 7/1997 | Ladouceur et al. ........ 29/432.2 |
| 5,868,535 | A | 2/1999 | Ladouceur .................. 411/181 |
| 6,122,816 | A | 9/2000 | Ladouceur .................... 29/509 |
| 6,546,613 | B1 * | 4/2003 | Donovan .................... 29/524.1 |

FOREIGN PATENT DOCUMENTS

EP 325978 A1 * 8/1989

* cited by examiner

*Primary Examiner*—Jermie E. Cozart
(74) *Attorney, Agent, or Firm*—Howard & Howard (57) ABSTRACT

A self-piercing element including a shank, a radial flange and a tubular barrel. The flange includes spaced concave surfaces and the annular bearing surface has an area at least four times the concave surfaces. The element is installed in a panel supported on a female die including a central die post, wherein the outer side wall is a frustoconical having an included angle between five and twelve degrees. During installation, the tubular barrel pierces an opening in the panel and the panel is drawn against the outer surface of the tubular barrel and the barrel is deformed into a U-shape. The flange is simultaneously received in the die cavity and the panel is incrementally deformed radially into the concave surfaces between the frustoconical side wall and the flange portion providing improved torque resistance.

16 Claims, 4 Drawing Sheets

METHOD OF ATTACHING A SELF-PIERCING ELEMENT IN A PANEL AND DIE MEMBER

This is a continuation of application Ser. No. 10/004,918, filed Dec. 5, 2001 now abandoned.

FIELD OF THE INVENTION

This invention relates to a self-piercing element, such as a self-piercing stud having a tubular barrel portion, the method of attachment, and a die member for attaching the self-piercing element to a metal panel.

BACKGROUND OF THE INVENTION

Self-piercing and clinching female fasteners such as nuts were developed by the predecessor in interest of the Applicant (Multifastener Corporation) about 50 years ago as disclosed for example in U.S. Pat. No. 2,707,322. Self-piercing and clinching nuts are attached to a metal panel in a die press which may also be used to simultaneously form the panel, wherein generally the upper die platen includes an installation head and the lower die platen includes a die member or die button. Such self-piercing and clinching nuts include a projecting pilot portion which pierces an opening in the panel and the panel metal adjacent the pierced panel opening is then clinched to the fastener with each stroke of the die press.

More recently, self-piercing and clinching male and female fasteners were developed having a tubular barrel portion as disclosed, for example, in U.S. Pat. No. 4,555,838 assigned to the assignee of this Application. The self-piercing and clinching fasteners disclosed in this patent include a tubular barrel portion and a radial flange portion. Such self-attaching male fasteners are installed in a die press, as described above, wherein the lower die platen includes a die button having a panel supporting surface, a central die post and an annular die cavity surrounding the die post. The annular die cavity includes a semicircular annular bottom surface, a radial lip portion at the upper extent of the semicircular bottom surface and a generally frustoconical surface extending from the radial lip portion to the end surface of the die button. In the embodiment disclosed in this patent, the generally frustoconical upper die surface includes a plurality of flats which extend from the annular lip to the end or bearing face of the die button which provide anti-rotation means by drawing and slightly deforming the flange of the stud fastener. It is very important in most applications of the self-piercing and riveting male fasteners that the fastener be able to withstand significant torque loads without twisting in the panel which may destroy the fastener and panel assembly. It was found, however, that the anti-rotation means disclosed in this patent was insufficient for many applications, including automotive applications.

Various attempts have been made to improve the torque resistance of self-piercing and riveting stud fasteners of the type disclosed in U.S. Pat. No. 4,555,838. Initially, anti-rotation protrusions or nubs were provided either on the barrel portion, adjacent the body portion, or on the flange portion adjacent the barrel portion as disclosed, for example, in U.S. Pat. No. 4,810,143, also assigned to the assignee of the present Application. Presently, self-attaching stud fasteners of the type disclosed herein include a plurality of spaced pockets in the outer edge of the flange portion adjacent the barrel portion as disclosed in U.S. Pat. No. 5,020,950, also assigned to the assignee of the present Application. There remains, however, several problems associated with the use of pockets in the flange portion as disclosed in U.S. Pat. No. 5,020,950. First, the die surfaces which form the pockets wear, such that the pockets are not always fully formed in the flange portion resulting in insufficient torque resistance. Second, the self-piercing stud fastener and panel assembly is press sensitive. That is, if the panel metal is not fully deformed into the pockets, the torque resistance will be inadequate. Further, the pockets form stress risers in the panel which can become a source of failure of the fastener and panel assembly. Finally, the use of pockets in the flange portion may provide insufficient torque resistance, particularly where extreme torque resistance is required.

There are also other problems associated with self-piercing and clinching fastener installations of the type disclosed herein which are addressed by the improved fastener, method of installation and die member of this invention. First, the flange portion which surrounds the bolt or stud portion in a male fastener for example is deformed both radially and axially relative to the stud portion by the annular plunger of the installation head which drives the self-piercing and clinching fastener into the panel and the die button, particularly where the press setting is greater than required for installation. This is because the flange portion bottoms against the panel in the die button during installation. As best described in the above-referenced U.S. Pat. No. 4,555,838, the panel metal adjacent the pierced panel opening bottoms on the radial lip of the die button and is then driven into the U-shaped end portion formed in the free open end of the barrel portion. Second, the installation of the self-piercing fastener in a panel is press sensitive. That is, if the press does not provide sufficient force for full installation, the fastener will be loose in the panel providing insufficient pull-out strength and torque resistance. Alternatively, in an "overhit" condition of the die press, the flange portion will be deformed by cold working as previously described. However, even where the fastener is properly installed in the panel with the preferred die setting, the torque resistance may be insufficient, as described above, or the stud or bolt may provide insufficient resistance to tilting in the panel assembly. Finally, the die button is relatively complex and therefore expensive to manufacture and has a relatively poor die life, particularly where the die button is utilized to install self-piercing fasteners of the type described herein in relatively high strength metals, such as HSLA steel. It would therefore be desirable to provide improved torque resistance, eliminate deformation or cold working of the flange portion, reduce sensitivity to die press settings and reduce the cost of the die button, while improving die life.

As described below, the preferred embodiment of the self-piercing and attaching fastener utilized in the method of installation preferably includes a plurality of spaced arcuate radially inwardly concave surfaces or arcuate scallops in the outer side surface of the flange portion. U.S. Pat. No. 6,122,816, assigned to the assignee of the present application, discloses a self-riveting stud fastener including a tubular barrel portion and a radial flange portion having a plurality of spaced arcuate radially inwardly concave surfaces on the outer surface of the flange portion which provide torque resistance and the barrel portion has a conical outer surface developed for installation in thicker panels having a preformed panel opening. Thus, the method of installation disclosed in this patent preferably includes preforming a panel opening and driving of the barrel portion through the panel opening into a semicircular annular die cavity which deforms the free end of the barrel portion into generally a U- or C-shape as disclosed. Continued driving of the flange portion with an annular plunger or punch then drives the flange portion into the panel, cutting and deforming the panel into the shape of the concave and convex surfaces, providing improved torque resistance.

However, the method of installation disclosed in U.S. Pat. No. 6,122,816 has many of the same problems described above in regard to the present method of installing a self-piercing fastener, including press sensitivity and deformation or cold working of the flange portion, particularly in an "overhit" setting of the press. It is possible to actually shear the flange portion from the barrel or body portion in an overhit condition. As the flange portion is driven into the panel by the method disclosed in this patent, the scalloped flange cuts into the panel forming stress risers particularly at the convex edges between the arcuate concave surfaces or flutes, reducing the integrity of the joint. Further, the panel metal under the flange is compressed, causing deformation of the bearing surface at the top of the flange.

SUMMARY OF THE INVENTION

The method of attaching a self-piercing element in a panel, self-piercing and clinching male fastener and die member of this invention reduces or eliminates the problems associated with the prior methods of installation and the die member is relatively simple in construction, reducing costs and increasing die life. As described further below, the self-piercing element utilized in the method of this invention includes a tubular barrel portion having an open free end and a radial flange portion adjacent the tubular barrel portion including an outer surface having a plurality of spaced inwardly concave surfaces or "scallops." In the preferred embodiment, the open free end of the tubular barrel includes an inner chamfer, such that the slug pierced from the panel has an external diameter slightly greater than the internal diameter of the tubular barrel portion. The panel slug is then received in the tubular barrel portion during installation, and the hole formed in the panel has an internal diameter less than the external diameter of the barrel portion, such that the panel portion adjacent the pierced panel opening will be driven into the die member as disclosed for example in the above-referenced U.S. Pat. No. 4,555,838.

The female die member or die "button" of this invention includes a generally planar panel-supporting end face, an annular concave die cavity defined in the end face and a central die post projecting from the annular concave die cavity toward the end face including an end surface spaced below the plane of the end face having an outer piercing surface preferably defined by a relatively sharp circular edge. The concave die cavity includes an annular semicircular bottom surface and preferably includes a continuous smooth frustoconical side wall which extends tangentially from the annular semicircular bottom surface to the end face, thereby eliminating the annular lip between the annular semicircular bottom surface and the generally frustoconical outer side wall as disclosed in the above-referenced U.S. Pat. No. 4,555,838. The smooth continuous frustoconical side wall preferably has an included angle of between 5 and 12 degrees, most preferably between about 6 and 10 degrees, which is substantially steeper than the generally frustoconical upper die surface disclosed in the above-referenced U.S. Pat. No. 4,555,838 and the more recent U.S. Pat. No. 5,140,735, also assigned to the assignee of the present Application.

As described further below, the preferred included angle of the smooth continuous frustoconical side wall of the die member will depend upon the diameter of the tubular barrel portion which is determined by the diameter of the stud portion of a male fastener and the thickness of the panel to which the self-piercing element is installed. Further, because in the method of attaching a self-piercing element in a panel of this invention, the panel surrounding the pierced panel opening is deformed into the annular concave die cavity around the intersection of the end face and the continuous frustoconical outer side wall, this intersection is preferably radiused with a radius of less than 0.04 inches, which is less than the preferred radius used in the present die button. In the preferred embodiment of the die member or die button, the outer surface of the die post or inner surface of the concave die cavity is defined by a frustoconical surface extending tangentially from the semicircular bottom surface to the end surface of the die post, preferably at an angle of about 7 degrees. Further, the piercing surface at the outer edge of the central die post is preferably relatively sharp and may include staking cavities as disclosed in the above-referenced U.S. Pat. No. 5,140,735 to permanently stake the pierced panel slug in the tubular barrel portion.

The preferred embodiment of the self-piercing and clinching fastener of this invention is a male fastener having a shank or stud portion, which may be threaded or unthreaded depending upon the application. For example, the stud portion could be the shank of a ball joint. The fastener further includes a radial flange portion integral with the shank portion and a tubular cylindrical barrel portion integral with the flange portion coaxially aligned with the stud portion having an open free piercing end. The outer surface of the flange portion includes a plurality of spaced concave surfaces which receive the panel during installation as described below. The annular bearing surface of the flange portion surrounding the stud portion is preferably flat and preferably has a surface area of at least five times the adjacent area of the concave surfaces measured in the plane of the bearing surface, more preferably at least six times or greater. Preferably, the width of the concave surfaces measured perpendicular to the shank portion is about 0.75 the width of the flange portion measured to the barrel portion.

The outer surface of the flange portion between the concave surfaces is preferably cylindrical and the concave surfaces are preferably spaced from the tubular barrel by a distance equal to or greater than the width of the concave surfaces measured from the outer cylindrical surface. Thus, the preferred embodiments of the self-piercing and clinching stud fastener of this invention has a substantially greater bearing area surrounding the stud portion reducing the likelihood of deformation or cold-forming of the flange portion during installation as described below. In the most preferred embodiment, the concave surfaces on the outer surface of the flange are cylindrical.

The method of attaching a self-piercing element in a panel of this invention then includes supporting a panel on the end face of the die button and driving the open free end of the tubular barrel portion of the self-piercing element against the panel and thereby the panel against the end surface of the central die post. Continued driving of the barrel portion of the self-piercing element against the panel pierces a slug from the panel between the open free end of the barrel portion and the central die post, forming an opening through the panel and simultaneously deforming a first panel portion adjacent the pierced panel opening into the annular die cavity around the intersection of the end face and the continuous frustoconical side wall of the die member. As the tubular barrel portion is driven through the pierced panel opening, the panel is drawn into a tube-shape against the cylindrical external surface of the barrel. The method of this invention then includes driving the inside surface of the tubular barrel portion against the semicircular bottom surface of the die cavity surrounding the die post, deforming the free end of the barrel portion into a U-shaped end portion. The panel is simultaneously drawn against the outer surface of the tubular barrel portion and into the developing U-shaped end of the tubular barrel portion. However, because the die member does not include an annular lip between the concave semicircular bottom surface and the frustoconical outer wall as disclosed in the above-referenced U.S. Pat. No. 4,555,838, the panel remains unsupported in the die cavity and the flange portion does not bottom in the die cavity against the panel as described above in regard to the prior method of installation.

Finally, the method of this invention includes incrementally deforming a second panel portion in the annular die cavity adjacent the end face against the continuous frustoconical side wall and into the spaced inwardly concave surfaces in the outer side surface of the flange portion substantially, but preferably not completely filling the concave surfaces. That is, the frustoconical outer side wall of the die cavity, which is inclined inwardly from the end surface, serves as a wedge, incrementally deforming the surrounding panel radially inwardly into the concave surfaces. This method should be differentiated from the method disclosed in the above-referenced U.S. Pat. No. 6,122,816, wherein the scalloped flange portion is driven into the panel, thereby cutting the panel as described above.

Because the panel is unsupported in the annular die cavity until the installation is complete and the flange is not driven into the panel bottomed in the die cavity, as described above, the method of this invention substantially eliminates deformation or cold working of the flange portion by the annular punch or plunger which drives the self-piercing element into the die cavity. Further, because of the relative simplicity of the die member, the cost is reduced and die life is improved. Further, because the panel metal is incrementally deformed or "squeezed" into the spaced inwardly concave surfaces on the outer surface of the flange portion, the torque resistance of the self-piercing fastener in the panel is significantly improved, particularly over the method disclosed in the above-referenced U.S. Pat. No. 4,555,838. In fact, testing indicates that the stud portion will fail normally in torque before rotation of the fastener element in the panel in stud fasteners having a shaft diameter of 6 mm or less. Further, because the entire side surface of the flange is fully supported in the panel, loose connections are substantially eliminated. Finally, the installation method of this invention is less sensitive to the die press setting. That is, an overhit condition will not result in deformation of the flange and the installation is less sensitive to "underhit" conditions.

The method of attaching a self-piercing element in a panel and die member of this invention therefore reduces or eliminates the problems associated with the prior methods of attaching a self-piercing element to a panel and results in a better installation. Other advantages and meritorious features of this invention will be more fully understood from the following description of the preferred embodiments, the claims and the appended drawings, a brief description of which follows.

DETAILED DESCRIPTION OF A PREFERRED EMBODIMENT

As set forth above, this invention relates to an improved self-piercing and clinching male fastener having significantly improved torque resistance, the method of attaching a self-piercing fastener to a panel and an improved female die member. As will be understood by those skilled in this art, the drawings illustrate preferred embodiments of this invention, but are not limiting except as set forth in the appended claims.

Figure 1:
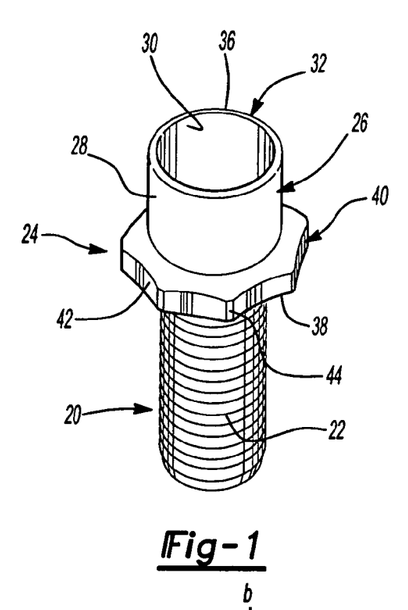
FIG. 1 is an end perspective view of a preferred embodiment of the self-piercing and clinching male fastener of this invention.
Figure 2:
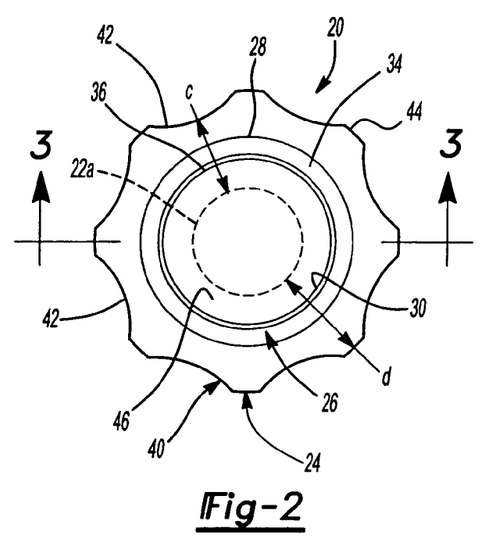
FIG. 2 is an end view of the self-piercing and clinching fastener shown in FIG. 1.
Figure 3:
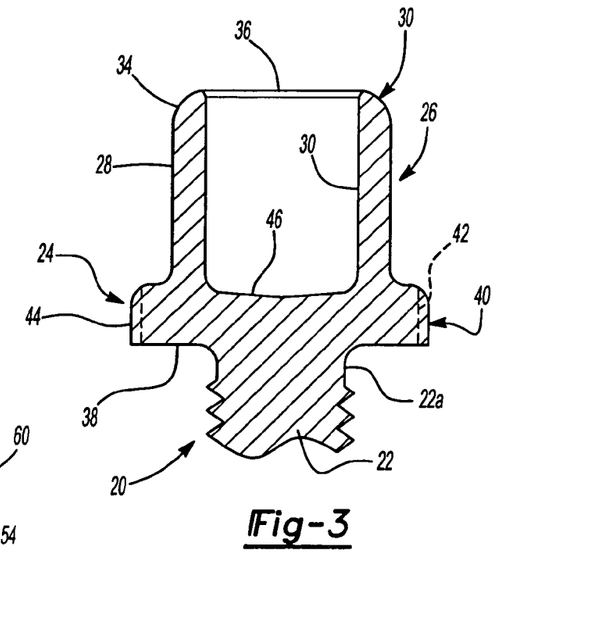
FIG. 3 is a partial side crosssectional view of the fastener illustrated in FIGS. 1 and 2.

FIGS. 1 to 3 illustrate one preferred embodiment of the self-piercing and clinching fastener 20 of this invention in the form of a male fastener having a threaded shank portion 22. As will be understood, the stud or shank portion 22 may be threaded or unthreaded and may take various forms. As used herein, the term "fastener" is primarily used to refer to the function of the fastener element, which is to attach a component to the panel or plate to which the self-piercing fastener 20 is attached. The term "self-piercing" refers to the function of the fastening element to pierce its own hole in the panel during the fastener installation as described below.

The self-piercing fastener 20 further includes a radial flange portion 24 integral with the shank portion 22 and a tubular barrel portion 26 integral with the radial flange portion 24 and coaxially aligned with the shank portion 22. The preferred embodiment of the tubular barrel portion 26 includes a cylindrical external surface 28 and a cylindrical internal surface 30 as best shown in FIG. 3. The tubular barrel portion includes a free open piercing end 32 having an arcuate annular outer bearing surface 34 and a chamfered internal piercing surface 36. As described more fully in the above-referenced U.S. Pat. No. 4,555,838, the chamfered piercing surface 36 centers the fastener on the panel during installation and pierces an opening in the panel having a diameter less than the external diameter of the cylindrical external surface 28.

The radial flange portion 24 includes an annular planar bearing surface 38 surrounding the shank portion 22 and an outer surface 40 includes spaced concave surfaces 42 and outer cylindrical surfaces 44 located between the concave surfaces 42 as best shown in FIG. 2. The outer surfaces 44 may also be flat. The relation between the diameter of the shank portion 22, the annular bearing face 38 and the concave surfaces 42 are important to the function and improvements provided by the self-piercing fastener 20 and method of this invention is described further below.

Figure 4:
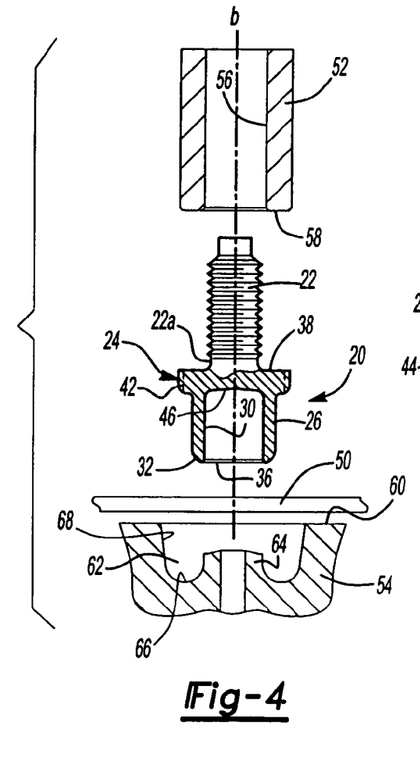
FIG. 4 is an exploded side view partially crosssectioned of the fastener illustrated in FIGS. 1 to 3 aligned for installation to a panel with a die member and driving member.

The self-piercing fastener 20 of this invention is particularly adapted for mass production applications, such as used by the automotive industry to install self-piercing and clinching fasteners in sheet metal parts including brackets, body panels and the like. Such sheet metal parts are typically formed in a die press. The self-piercing fastener of this invention may be installed in the sheet metal panel or plate with each stroke of the die press, wherein the upper platen typically includes an installation head having a reciprocating plunger 52 and the lower die platen includes a female die member or die button 54 as shown in FIG. 4 and described more fully in the above-referenced U.S. Pat. No. 4,555,838. The annular plunger 52 includes a cylindrical bore 56 which receives the shank or stud portion 22 of the fastener and the driving end portion 58 of the plunger is configured to be received against the planer annular bearing face 38 of the radial flange portion 24 as shown in FIGS. 4 et. seq. The female die member or die button 54, best shown in FIG. 5, includes a planer end bearing face 60 which supports the panel 50 and the panel 50 may be clamped to the bearing face 60 (not shown). The female die member 54 includes an annular female die cavity 62 defined in the bearing face 60 surrounding a central die post 64. The annular die cavity 62 includes an annular semicircular bottom surface or wall 66 and a frustoconical outer side wall 68 which extends tangentially from the semicircular bottom wall 66 to the bearing face 60 and joins the bearing face 60 in a radius 70. The smooth continuous frustoconical outer side wall 68 extends tangentially from the annular semicircular bottom wall 66 at an included angle "a" show in FIG. 5 of between 5 and 12 degrees, most preferably between about 6 and 10 degrees and the radius joining the frustoconical outer side wall 68 and the bearing face 60 is preferably less than 0.04 inches. The end surface 76 of the central die post 64 may also include staking cavities to retain the slug pierced from the panel 50 as disclosed in the above-referenced U.S. Pat. No. 5,056,207. The advantages of the unique die button 54 and self-piercing fastener 20 of this invention will be understood from the following description of the method of installation of this invention described below.

Figure 5:
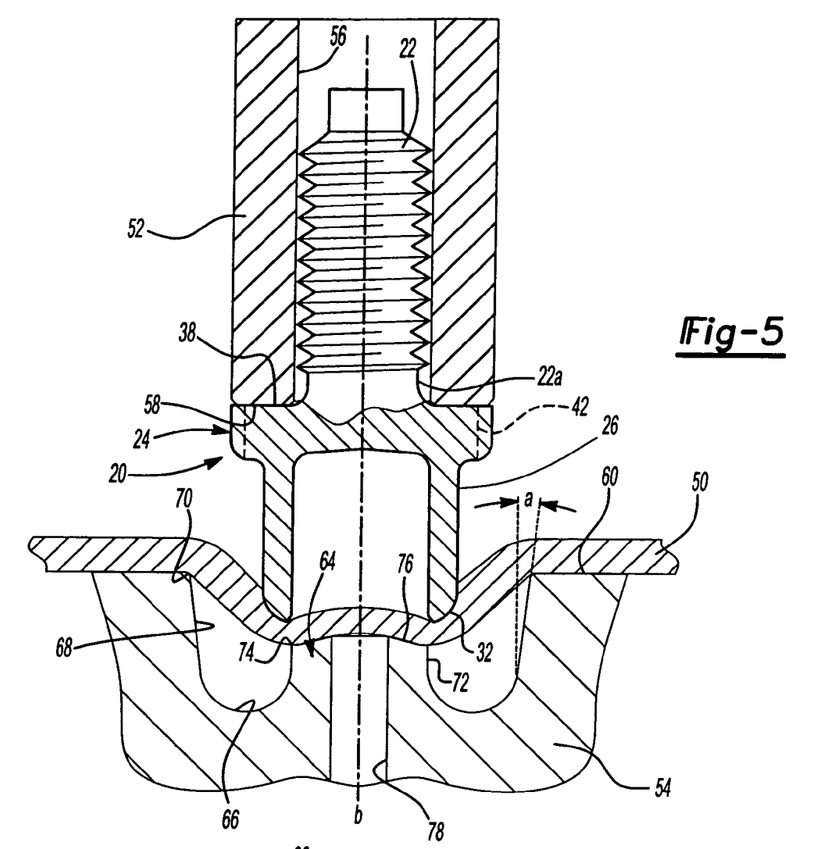
FIG. 5 is a side crosssectional view during the initial installation of the fastener illustrated in FIGS. 1 to 4 in a preferred embodiment of the die member of this invention.

As shown schematically in FIG. 4, the self-piercing male fastener 20, plunger 52 and the die button 54 are aligned by the installation apparatus or "head" (not shown) along the longitudinal axis "b" prior to installation. As disclosed more fully in the above-referenced U.S. Pat. No. 5,092,724, the self-piercing male fastener element 20 is received in the installation head is generally located in the upper die platen and the shank portion 22 is initially received in the axial bore 56 of the plunger prior to installation. As set forth above, the panel 50 may be clamped to the bearing face 60 of the die button in the lower die platen (not shown). FIG. 5 illustrates the initial step in the installation sequence of the self-piercing fastener 20 in the panel 50. The driving end 58 of the plunger 52 is driven against the annular bearing face 38 of the radial flange portion 24, which drives the free open end 32 of the barrel portion 26 against the panel 50, which deforms the panel 50 against the end face 76 of the die post 64 as shown in FIG. 5. The panel 50 is deformed into the die cavity 62 against the end face 76 of the die post 64 around the arcuate surface 70 as shown.

Figure 6:
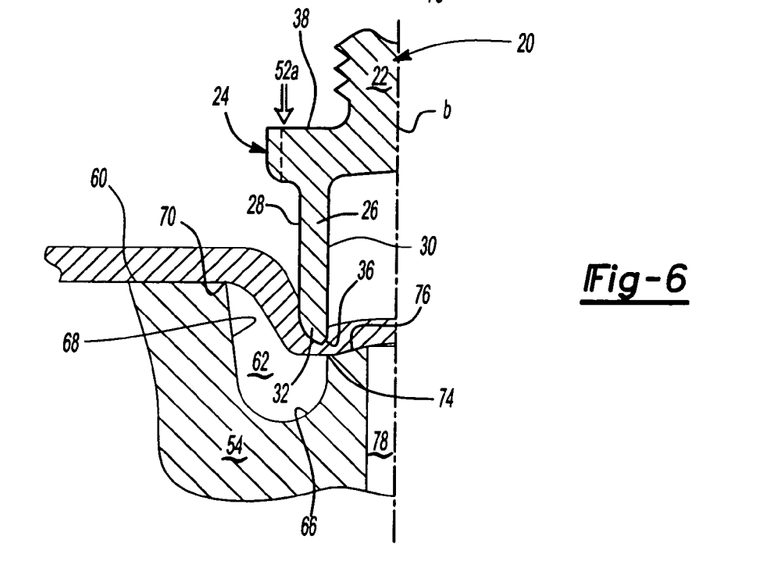
FIGS. 6 to 14 are side crosssectional views of the fastener and die member of this invention illustrating the installation sequence and the method of installation of this invention.
Figure 7:
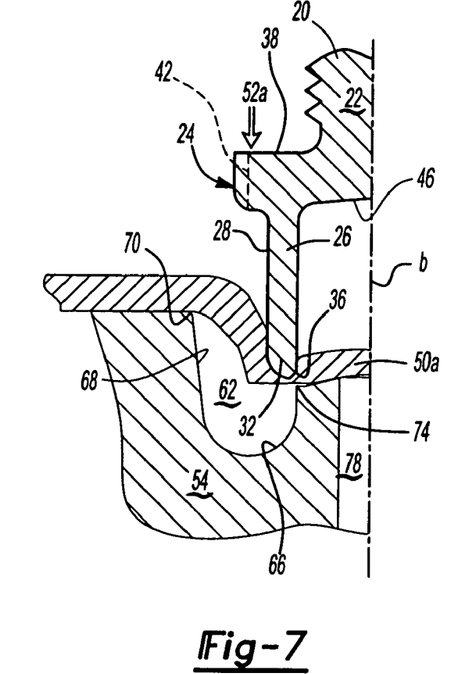
Figure 8:
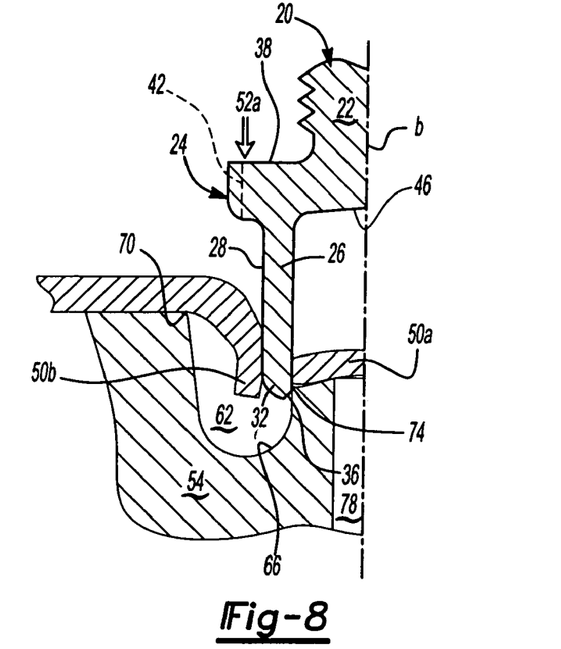
Figure 9:
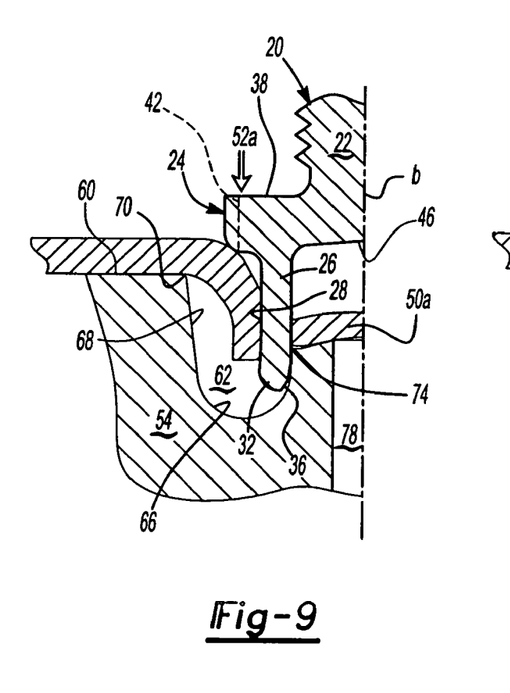
Figure 10:
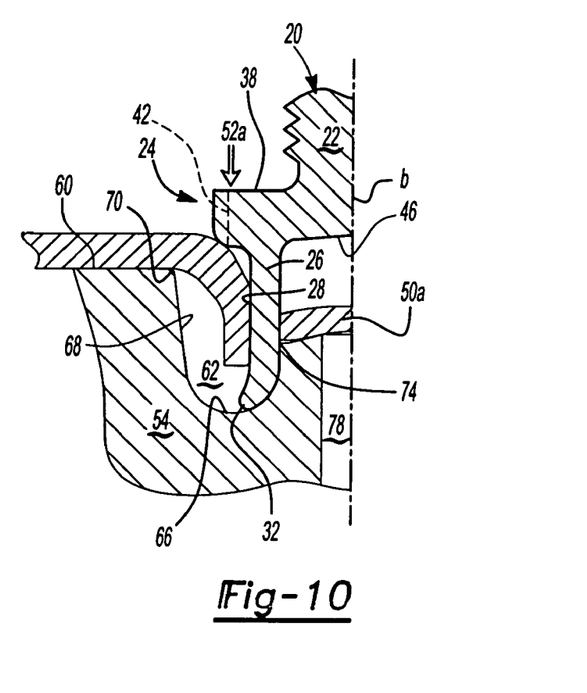
Figure 11:
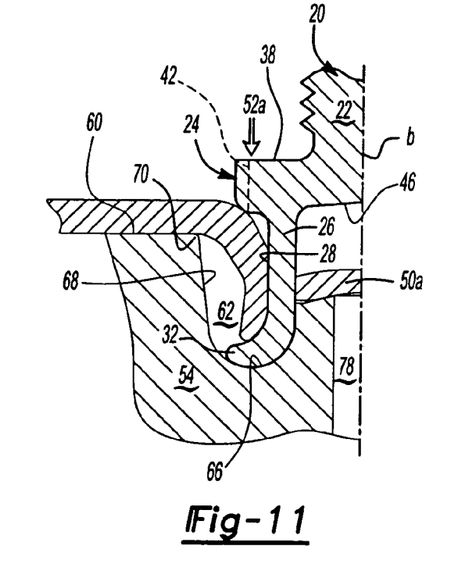
Figure 12:
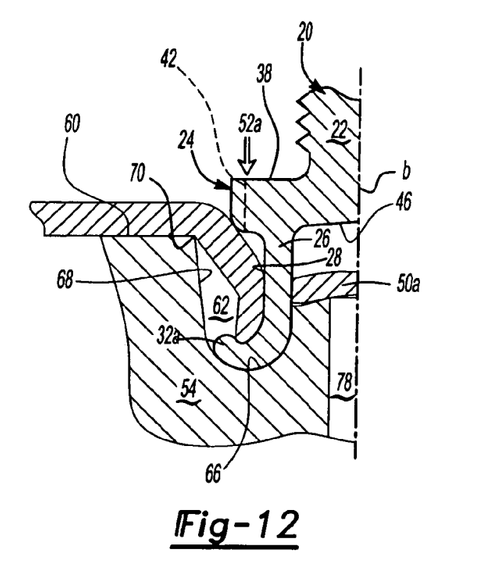
Figure 13:
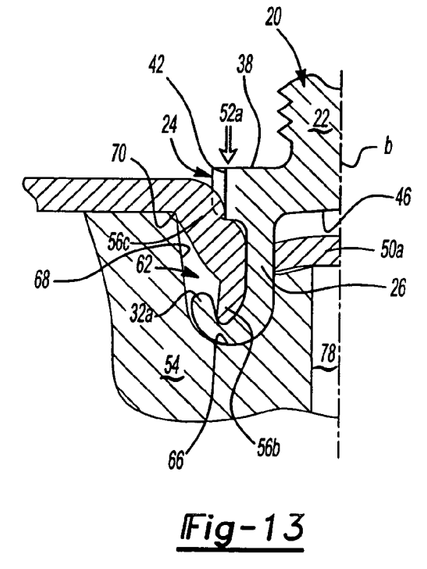

FIGS. 6 to 14 illustrate the sequence of installation of the fastener 20 in the panel 50, wherein the plunger 52 is replaced by an arrow 52a for clarity. As shown in FIG. 6, the chamfered piercing surface 36 cuts the panel against the circular outer sharp piercing edge 74 of the die post 64 as shown in FIGS. 6 and 7 until a slug 50a is cut from the panel as shown in FIG. 8. The edge portion of the panel 50b adjacent the pierced slug 50a is then received against the cylindrical external surface 28 of the tubular barrel 26 as shown in FIGS. 8 and 9, wherein the external surface 28 of the tubular barrel 26 draws the panel portion 50b into the annular die cavity 26. The internal surface 30 of the tubular barrel portion 26 is then received first against the frustoconical surface 72 of the die post 64 as shown in FIG. 9 and then against the annular semicircular bottom wall 66 as best shown in FIG. 10, wherein the free open end 32 of the tubular barrel portion 26 is deformed sequentially against the annular semicircular bottom wall 66 into a U-shape as shown in FIGS. 10 to 12. It should be noted that during the sequence of installation illustrated in FIGS. 10 to 12, the panel portion 50b remains unsupported in the die cavity 26 and against the outer surface 28 of the tubular barrel. Further, it is important to note that the flange portion 24 is not driven into the panel portion 50b as shown in FIGS. 10 to 12 and the panel portion 50b remains spaced from the outer wall 68 of the annular die cavity, contrary to the teaching of the present method of installation as disclosed in the above-referenced U.S. Patents. The panel portion 50b adjacent the pierced panel edge is eventually enclosed within the U-shaped end portion 32a as shown in FIGS. 12 and 13. However, upon forming of the free end 32a in the annular semicircular bottom wall 66, the U-shaped free end 32a is spaced from the frustoconical side wall 68 as shown in FIG. 13.

Figure 14:
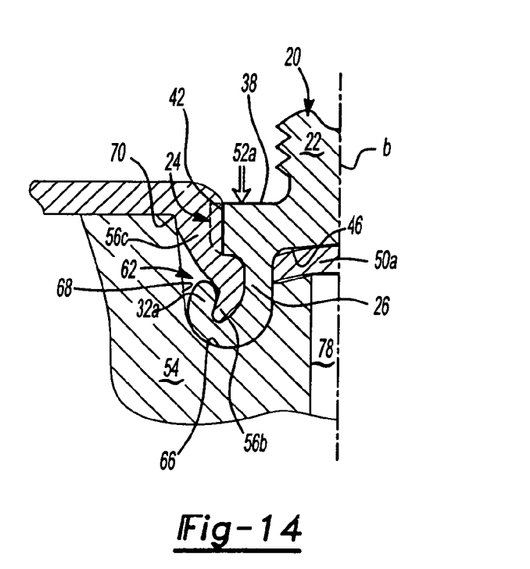

Finally, as shown in sequence drawings of FIGS. 13 and 14, the panel portion 56c in the die cavity 26 adjacent the upper radius 70 is then incrementally squeezed between the side wall 68 adjacent the radius 70 and the cylindrical surfaces 44 radially into the spaced concave surfaces 42 until the panel metal substantially fills the concave surfaces 42 as shown in FIG. 14. As shown in FIG. 14, the flange portion 24 preferably is driven into the die cavity 62 such that the annular bearing surface 38 is slightly spaced below the plane of the panel 50. This is because the fastener portion, which is the shank portion 22 in the disclosed embodiment, is used to attach a component (not shown) to the panel 50 wherein the component preferably lies flush on the panel. As will be understood, if the installation was designed to have the bearing surface 38 flush with the panel, normal tolerance build up would result in some of the installations having a flange portion above the panel 50. As will also be understood from the above description of the method of this invention and the sequence of installation shown in FIGS. 6 to 14, the panel 50 and the free end 32a of the barrel portion does not contact the frustoconical outer side wall 68 except adjacent the planar bearing face 60. Thus, the frustoconical side wall 68 is not necessary except adjacent the opening a depth equal to the width of the flange portion plus the distance the flange portion is recessed below the plane of the panel 50. Further, in the preferred embodiment, the panel portion 56c is squeezed or deformed into the spaced concave surfaces 42 to substantially, but not completely fill the concave surfaces 42 to avoid deformation of the flange portion 24. The frustoconical outer side wall 68 adjacent the bearing face 60 thus serves as a wedge as the flange portion 24 is driven into the die cavity 62, incrementally deforming the panel portion 56c into the concave surfaces 42.

The panel slug 50a is simultaneously driven toward the bottom surface 46 of the radial flange portion and may be retained against the bottom portion as disclosed in the above-referenced U.S. Pat. No. 5,067,207. As set forth above, the flange portion 24 is not driven into the panel as disclosed in the above-referenced U.S. Patents, but is incrementally squeezed radially into the spaced concave surfaces 42 by the cylindrical surfaces 44 between the concave surfaces, thereby providing superior torque resistance particularly in thin panels having a thickness of 0.030 to 0.040 inches while avoiding the problems associated with the prior methods of installation as discussed further below. As set forth above, the shank portion 22 failed during torque testing without any rotational movement of the fastener in the panel assembly.

As set forth above, the relationship between the area of the annular bearing face 38 and the spaced concave surfaces 42 is important in the self-piercing fastener 20 and method of installation of this invention. First, the bearing face 38 must be sufficient to prevent axial deformation or cold working of the flange portion which occurs with the prior methods of installation particularly in an "overhit" condition of the die press although the method of installing the self-piercing fastener 20 in a panel is significantly less press sensitive than the prior methods described in the above-referenced U.S. Patents. This is because the radial flange portion 24 is not driven into the panel 50 and the panel portion 56c remains unsupported radially in the die cavity 62. The panel metal does not fill the die cavity 62 even when the installation is complete as shown in FIG. 14. Further, although in the preferred embodiment, the concave surfaces 42 are cylindrical, other concave surfaces may be employed providing superior torque resistance.

The preferred dimensional relationship between the annular bearing surface 38, the concave surfaces 42 and the tubular barrel 26 of the self-piercing fastener 20 of this invention with the shank portion 22a integral with the radial portion 24 can best be explained with reference to FIG. 2, wherein the shank portion 22a is shown in phantom. The area of the annular bearing face 38 surrounding the shank portion 22a is at least five times the surface area of the spaced concave surfaces or fillets 42 measured in the plane of the bearing surface 38, more preferably at least six times. More specifically, the surface area ratio in a 6 mm stud is 6.3, the ratio for an 8 mm stud is 7.2 and the ratio for a 10 mm stud is 8.5. Stated another way, the dimension "c" in FIG. 2 measured from the shank portion 22a to the spaced concave surfaces 42 is at least 70 percent of the dimension "d" measured from the shank portion 22a to the cylindrical outer surfaces 44 between the spaced concave surfaces. The concave surfaces 42 are also preferably spaced from the cylindrical external surface 28 of the tubular barrel portion 26 a distance equal to about 0.75 than the distance between the cylindrical outer surface 28 of the tubular barrel portion and the cylindrical external surfaces 44.

As will now be understood, the self-piercing fastener, method of installation and die member of this invention provide superior torque resistance while avoiding the problems associated with the prior installation methods. As set forth above, the bearing surface 38 of the flange portion 24 is not deformed radially or axially relative to the stud portion 22 by the annular plunger 52 during installation even where the die force is greater than required for installation. Further, the installation is not as press sensitive as the prior methods and because the flange portion is not driven into the panel, stress risers are not created at the concave surfaces or fillets.

The invention claimed is:

1. A method of attaching a self-piercing element in a panel supported on a die member, said self-piercing element including a tubular barrel portion having an open free end including a piercing surface and an integral radial flange portion adjacent said tubular barrel portion including an outer surface having a plurality of spaced inwardly concave surfaces, said die member including a panel supporting end face and an annular die cavity in said end face including a central die post having an end surface including a piercing surface spaced below the plane of said end face and said annular die cavity surrounding said central die post, said annular die cavity including a semicircular annular bottom surface and a substantially continuous frustoconical side wall having an included angle of between 5 degrees and 12 degrees extending from said semicircular annular bottom surface to said end face, said method comprising the following steps:

supporting a panel on said end face of said die member;

driving said open free end of said tubular barrel portion against said panel and said panel against said end surface of said die post;

continuing to drive said open free end of said barrel portion against said panel, piercing a slug from said panel between said piercing surfaces of said barrel portion and said end surface of said central die post, forming an opening through said panel, and simultaneously deforming a first portion of said panel adjacent said opening into said annular die cavity against an outer surface of said tubular barrel portion;

driving said open free end of said barrel portion against said semicircular annular bottom surface of said annular die cavity, deforming said free open end of said barrel portion radially outwardly and upwardly toward said end face adjacent to but spaced from said side wall, forming a U-shaped end portion of said barrel portion, and deforming a pierced edge of said panel portion into said U-shaped end portion of said barrel portion; and continuously, incrementally deforming a second panel portion in said annular die cavity between said outer surface of said flange portion of said self-piercing element and said side wall of said annular die cavity radially into said inwardly concave surfaces.

2. The method as defined in claim 1, wherein a distance between said continuous frustoconical side wall adjacent said end face and said outer surface of said flange portion is less than the thickness of said panel, said method including thinning said panel at locations between said spaced inwardly concave surfaces.

3. The method as defined in claim 1, wherein said method includes maintaining said first panel portion spaced from an outer wall of said annular die cavity.

4. The method as defined in claim 1, wherein said outer surface of said radial flange portion includes a plurality of circumferentially spaced radially projecting portions and said concave surfaces are defined between said radially projecting portions, said method including driving said radial flange portion against said second panel portion, deforming said second panel portion between said frustoconical side wall of said die member and an outer surface of said radial projections into said concave surfaces.

5. A method of attaching a self-piercing element in a panel supported on a die member, said self-piercing element including a tubular barrel portion having an open free end and an integral radial flange portion adjacent said tubular barrel portion having a generally cylindrical outer surface including a plurality of circumferentially spaced inwardly concave surfaces, said die member including an end face, a central die post having an end surface spaced below the plane of said end face and an annular die cavity surrounding said central die post, said annular die cavity including an annular semicircular bottom surface and a frustoconical side wall extending tangentially from said semicircular bottom surface to said end face, said method comprising:

supporting a panel on said end face of said die member;

driving said open free end of said barrel portion of said self-piercing element against said panel and said panel against said end surface of said central die post;

continuing to drive said open free end of said barrel portion against said panel, thereby piercing a slug from said panel between said open free end of said barrel portion and said end surface of said central die post and forming an opening in said panel;

deforming a portion of said panel adjacent said opening into said annular die cavity against an external surface of said tubular barrel portion around an intersection of said end face and said continuous frustoconical side wall of said die member;

driving said free open end of said barrel portion against said semicircular annular bottom surface of said annular die cavity, thereby deforming said free open end of said barrel portion radially outwardly and upwardly toward said end face and around said portion of said panel, thereby forming a U-shaped end portion of said barrel portion enclosing said portion of said panel, deforming a pierced edge of said first panel portion in said U-shaped end portion into an enlarged bead having a height measured between said flange portion and said U-shaped end portion of said barrel portion greater than its width; and continuously, incrementally deforming a second panel portion in said annular die cavity adjacent said end face of said die member between said cylindrical surface of said flange portion and said side wall, thereby thinning said second panel portion and deforming said second panel portion radially into said plurality of spaced inwardly concave surfaces.

6. The method as defined in claim 5, wherein said method includes driving said radial flange portion against said second panel portion in said die cavity, deforming said second panel portion between said frustoconical side wall and said generally cylindrical outer surface of said radial flange portion into said spaced inwardly concave surfaces of said flange portion.

7. The method as defined in claim 5, wherein said frustoconical side wall has an included angle of between 5 degrees and 12 degrees and said method including deforming said free open end of said barrel portion upwardly adjacent to but spaced from said frustoconical side wall.

8. A die member for attaching a self-piercing element having a tubular barrel portion having an open free end and an integral radial flange portion having an outer surface including circumferentially spaced radially projecting portions and concave portions between said radially projecting portions in a panel supported on said die member, said die member comprising:

a generally planar panel-supporting end face, an annular concave die cavity defined in said end face, and a central die post having an outer diameter substantially equal to the inner diameter of the open free end of the tubular barrel portion projecting from said annular concave die cavity toward said end face including an end surface spaced below the plane of said generally planar panel-supporting end face and an annular sharp outer piercing surface adapted to pierce a panel supported on said generally planar panel-supporting surface of the tubular barrel portion of a self-piercing fastener element, said annular concave die cavity surrounding said die post including an annular semicircular bottom surface and a continuous smooth frustoconical outer side wall extending tangentially from said annular semicircular bottom surface to said end face having an included angle of between 6 and 10 degrees.

9. The die member as defined in claim 8, wherein said frustoconical outer side wall joins said end face in a radiused surface having a radius of less than 0.04 inches.

10. The die member as defined in claim 8, wherein said outer piercing surface of said central die post is defined by an outer annular planar surface and a frustoconical inner surface extending tangentially from said annular semicircular bottom surface to said outer annular planar surface defining a sharp piercing edge.

11. A method of attaching a self-piercing element in a panel supported on a die member, said self-piercing element including a tubular barrel portion having an open free end including a piercing surface and an integral radial flange portion including an outer surface, said outer surface of said radial flange portion including a plurality of circumferentially spaced radially outwardly projecting portions separated by concave surfaces, said die member including a panel supporting end face and a die cavity including a central die post having an end surface having an annular piercing surface spaced below a plane of said end face, a concave annular die surface surrounding said die post having a generally semicircular annular bottom surface and a frustoconical side wall adjacent said end face having an included angle of between 5 degrees and 12 degrees, said method comprising the following steps:

supporting a panel on said end face of said die member;

driving said open free end of said tubular barrel portion against said panel and driving a first panel portion into said die cavity against said end face of said die post;

continuing to drive said open free end of said barrel portion against said first portion of said panel, piercing a slug from said panel between said piercing surfaces of said barrel portion and said end face of said central die post, forming an opening through said panel, and simultaneously deforming said first portion of said panel adjacent said opening against said generally semicircular annular bottom surface of said concave die cavity against an outer surface of said tubular barrel portion;

continuing to chive said open free end of said barrel portion against said generally semicircular annular bottom surface of said annular concave die cavity, deforming said free open end of said barrel portion radially outwardly and upwardly toward said end face of said die member, forming a U-shaped end portion of said barrel portion, and deforming a pierced edge of said panel into said U-shaped end portion of said barrel portion; and driving said radial flange portion against a second panel portion in said die cavity adjacent said end face of said die member, deforming said second panel portion between said frustoconical side wall and outer surfaces of said plurality of circumferentially spaced radially outwardly projecting portions of said outer surface of said radial flange portion and into said concave surfaces defined between said radial projecting portions preventing rotation of said self-piercing clement relative to said panel.

12. The method as defined in claim 11, wherein said frustoconical side wall of said die cavity is continuous and extends from said generally semicircular annular bottom surface to said end face of said die member, said method including deforming said free open end of said tubular barrel portion upwardly adjacent to but spaced from said frustoconical side wall.

13. The method as defined in claim 11, wherein said method includes deforming a pierced edge of said first panel portion in said U-shaped end portion having a height measured between said flange portion and said U-shaped end portion of said barrel portion greater than its width.

14. A die member for attaching a self-piercing element to a panel, said self-piercing element including a tubular barrel portion having a free open end and an integral radial flange portion having an outer surface including a plurality of circumferentially spaced radially outwardly projecting portions separated by concave surfaces, said die member comprising:

a planar panel supporting end face and a die cavity defined in said end face including a central die post having an outer diameter generally equal to an inner diameter of the free open end of the tubular barrel portion of the self-piercing element and an end face of said die post including a sharp outer annular piercing surface spaced below a plane of said panel supporting end face adapted to pierce a panel upon engagement by the free open end of the tubular barrel portion, a concave generally semicircular die surface surrounding said die post and a continuous smooth frustoconical side wall extending tangentially from said concave generally semicircular die surface to said panel supporting end face having an included angle of between 5 degrees and 12 degrees.

15. The die member as defined in claim 14, wherein said continuous frustoconical side wall joins said end face in a radiused surface having a radius of less than 0.04 inches.

16. The die member as defined in claim 14, wherein said outer piercing surface of said die post is defined by an outer annular planar end surface and a frustoconical side wall extending tangentially from said semicircular bottom surface to said outer annular planar surface at an included angle of about 7 degrees.

* * * * *

UNITED STATES PATENT AND TRADEMARK OFFICE
CERTIFICATE OF CORRECTION

PATENT NO. : 7,047,617 B2
APPLICATION NO. : 10/733704
DATED : May 23, 2006
INVENTOR(S) : Harold A. Ladouceur It is certified that error appears in the above-identified patent and that said Letters Patent is hereby corrected as shown below:

In column 12, line 45, please delete "chive" and insert --drive--.

In column 14, line 2, before the word "panel," please insert --planar--.

In column 14, line 8, before the word "panel," please insert --planar--.

Signed and Sealed this

Sixth Day of March, 2007

JON W. DUDAS
*Director of the United States Patent and Trademark Office*